Oct. 9, 1923.
F. H. WELLER
LINE FASTENER
Filed Oct. 1, 1921
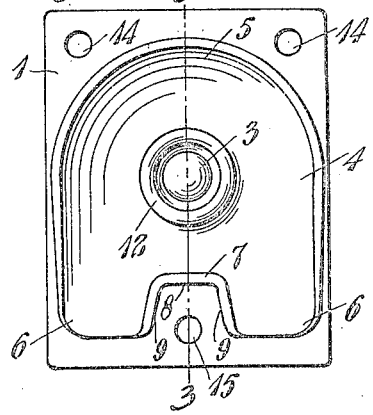
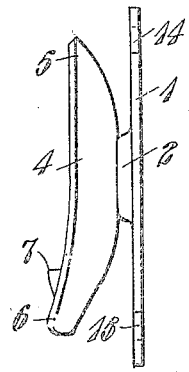
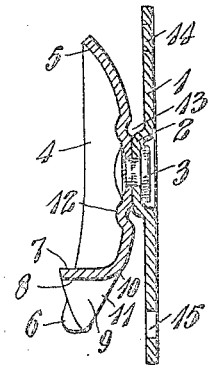
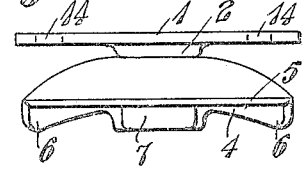
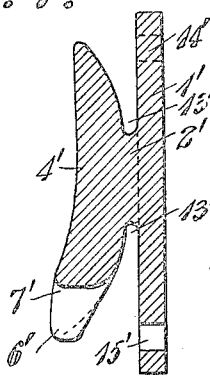
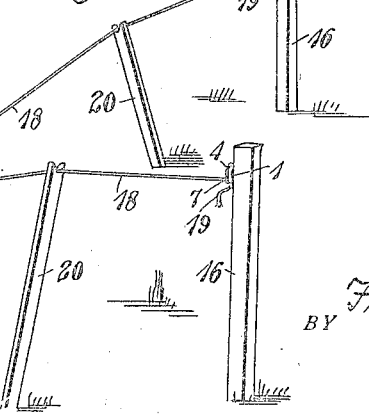
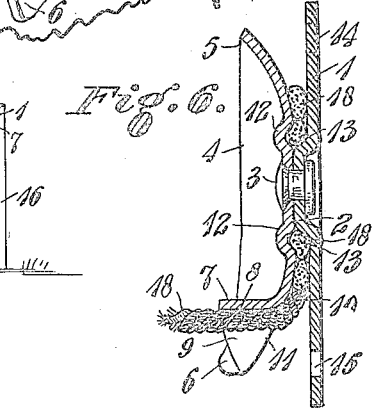
INVENTOR
Frederick H. Weller
BY Clarence Perdew
ATTORNEY Patented Oct. 9, 1923.

1,470,408

UNITED STATES PATENT OFFICE.

FREDERICK H. WELLER, OF CINCINNATI, OHIO.

LINE FASTENER.

Application filed October 1, 1921. Serial No. 504,609.

*To all whom it may concern:*

Be it known that I, FREDERICK H. WELLER, a citizen of the United States, residing at Cincinnati, in the county of Hamilton and State of Ohio, have invented certain new and useful Improvements in Line Fasteners, of which the following is a specification.

My invention relates to clothes-line fasteners, and its object is to provide for quick fastening, without tying, of a clothes-line or other line, to prevent slippage of such a quickly fastened line, either from weight placed upon it or from raising it, as by a prop, and to avoid injury to the line so fastened. Other objects will appear in the course of the ensuing description.

I attain these objects by the device illustrated, for example, in the accompanying drawing, in which—

Figure 1 is a front elevation;
  Fig. 2 is a side elevation;
  Fig. 3 is a vertical front-to-rear section on the plane of the line 3—3 of Fig. 1;
  Fig. 4 is a top plan view;
Fig. 5 is a perspective view of the device attached to a support, with a line fastened therein, one disposition of the line being shown in full lines and dotted lines, and other dispositions thereof being indicated by broken dot-and-dash lines;
  Fig. 6 is a section similar to that of Fig. 3, with the line in place as in Fig. 5, showing more clearly how the line is clamped in the device;
Fig. 7 is a section similar to those of Figs. 3 and 6, of a modification of the device according to my invention; and
  Fig. 8 is a perspective view of a number of posts equipped with my invention, holding a line, and showing how props are used therewith.

As shown in Figs. 1 to 6, inclusive, there is a back-plate 1 of rectangular shape, having near its center a circular forward depression 2 with a central hole through which a rivet 3 passes to secure the front-plate 4 rigidly and non-rotatably to the back-plate 1 on the front of the forward depression 2.

The front-plate 4 has a semi-circular upper part 5 and an approximately rectangular lower part, which, however, preferably has its lower corners 6 rounded. In the middle of this lower part a lip 7 is pressed forwardly and upwardly from the lower edge of the front-plate 4, so as to form a downwardly opening recess or notch in the bottom of the front-plate 4, with a smooth top 8 and smooth sides 9 of material area and merging into the rear side of the plate 4 in ample curves 10 and 11, respectively. The entire front-plate 4 is concavo-convex, with the concave side forward and presenting its convex back toward the back-plate 1, with the rim or edges of the front-plate spaced considerably forward from said back-plate 1. Preferably, the lower corners 6 are bent forward farther than the rest of the periphery of this plate 4.

Concentric with and just radially outward from the forward depression 2 of the back-plate 1, I prefer to provide in the front-plate 4 the annular bead 12, pressed forward, leaving a restricted annular channel 13 entirely around the depression 2, of cross-section that opens backwardly and upwardly. The opening in the cross-section is thus equal to about one-third or one-fourth of the circumference of the cross-section of this annular channel, as seen clearly in Figs. 3 and 6.

For fastening the device to a wall, post, or other support, the back-plate 1 has openings for the passage of screws, nails, bolts or other fastening means. Preferably, two of these openings 14 are near respective upper corners of the plate 1 and accessible where the front-plate 4 is rounded; and a third opening 15 is at the middle of the bottom part of this plate 1 and accessible where the lip or recess 7 is formed in the front-plate 4, as clearly seen in Fig. 1.

In Fig. 7, the device is substantially the same as the example just described, but the back and front parts are integral, as would be formed by casting; the first example being more appropriate for making of sheet metal. This integral construction comprises the back 1' with a neck 2' joining it at its center to the front 4'. The front face of this front 4' is not concave, but the rear face, toward the back part 1' is convex, forming a wide entrance all around, to the restricted annular channel 13' in next to the neck 2'. Here the annular groove formed in the rear of the front-plate by the bead 12 in the first example is absent, to facilitate casting; this also being the reason for not making the front face of the front part 4' concave. The lower part of the front 4' curves forwardly, so as to have the forwardly spaced corners 6', one of which is indicated by the dotted line; and at the middle is the notch 7', corresponding in shape to the notch or lip 7 of the first example. The back 1' has the upper openings 14', one of which is indicated by dotted lines, and the lower opening 15', corresponding in location to the openings 14 and 15, respectively, of the first example.

It will be understood that the fastener of either kind, that of Fig. 7 or that of Figs. 1 to 6, is used as indicated in Figs. 5, 6 and 8, and as will now be described.

Being secured rigidly to the support, as the post 16, Fig. 5, by suitable fastening means, as the screws 17 there shown, through the holes 14 and 15, the line 18 is passed one or more times around in the space between the front-plate 4 and the back-plate 1, with one part of the line 18 overlapping another part, and when the line is drawn tight it contracts its loop around the central part of the device, down into the restricted channel 13 as seen in section in Fig. 6. The innermost coil or loop of the line thus is compacted very tightly within the channel 13, inside a succeeding coil or loop, so that it is frictionally held substantially throughout its surface. The surfaces of the channel 13 being smooth, no cutting of the line occurs, yet the tightness of compacting of these parts of the line is such that the friction is relatively great notwithstanding the smoothness of the fastener surfaces. Also, although the line thus is very securely held, it is pulled from the restricted spaces readily by a reverse unwinding operation. Thus any tying or untying of knots is avoided.

If the line is to be stretched side-wise from the fastener, as indicated by the broken line A or the broken line B in Fig. 5, the operation just described completes the fastening. This may be a stretching in only one direction, as at A or at B, with the end of the line, as at 19, hanging slack; or it may be a stretching of the line in both directions, as at A and at B, with this fastener intermediate between others supporting the respective stretches of line. The fastener having such an intermediate relation will maintain each stretch, A and B, of the line 18 independently of the other; so that if one stretch is loaded more heavily than the other, or if one stretch should break, for instance, there will be no shifting at the fastening. Thus, the more heavily loaded stretch will not sag from slackening of the less heavily loaded stretch; and breaking of one stretch will not result in falling of the other stretch. Similarly, in putting up a single line in successive stretches, once a stretch is tightened, to remove its slack, it is at once fastened, without tying, and the next stretch can be tightened and fastened at the next fastener with only its own resistance to be overcome. This reduces the labor of putting up a line in this way.

If the line 18 is to be stretched forwardly from the fastener, as indicated by the full lines in Fig. 5, after making the loops around the device as above described, the main part of the line is brought down under the bottom of the front-plate 4, the rounding and forward bending of the corners 6 faciliating this, and is led out through the lip, recess or notch 7, in which it thus is held so as not to shift sidewise and upward when a prop 20 (Fig. 8) is placed under the line, as usual in management of a clothes-line.

This recess or notch 7 permits considerable swinging of the line 18 to one side or the other, as at C in Fig. 5, so that the line may be stretched in any one of a number of directions from the front of the fastener, with this recess 7 functioning to retain the line when propped, as just described. Also, if the line is to have an abrupt change of direction, with the fastener intermediate of other fasteners, as on the post 16' of Fig. 8, one part B enters from the side of the fastener as in Fig. 5, and the succeeding stretch passes out in the recess or notch 7. It will be understood that this is the case in an arrangement in either direction from the side, as at B or as at A in Fig. 5, with the succeeding stretch through the recess 7 as shown by the full lines in that view.

Thus, in any arrangement, the line is put up and taken down by simple winding or unwinding operations, without the labor and without the wear and tear on the line that is involved in tying and untying. The avoidance of tying and untying is especially important when the line is wet, making such operations very difficult, and some times necessitating cutting of the line. The facility with which a line is put up in succeeding stretches, and propped, without slippage from the support or as from one stretch to another upon unequal loading or propping, also is an improvement over the usual necessity of tying the line at each intermediate support, as with hooks, nails or the like; as such tying, to prevent such slippage, is accomplished, if at all, only with considerable skill and much labor.

Modifications other than or in addition to those exemplified herein may occur; and while certain constructional details are deemed preferable in connection with my invention, and I have shown and described these rather specifically in elucidating the construction and use of my invention, as is required, I do not wish to be understood as being limited to such precise showing and description, but having thus fully described my invention,

What I claim as new and desire to secure by Letters Patent is:

1. In a line-fastener, two upright rigid members rigidly related to each other with an annular channel between them, the sides of said channel being substantially smooth and converging radially inwardly but materially spaced apart at their radially innermost extent, whereby a line may be wound therearound and held therebetween and one of said members having a recess in its lower edge with lateral and radially inward walls of material line-protecting area and smoothness, to receive the taut portion of the line and prevent unwinding of said line when said taut portion is raised.

2. In a line-fastener, two rigid members rigidly related to each other with an annular channel between them, one of said members being substantially semi-circular in its upper extent and approximately rectangular in its lower extent and having a recess substantially in the middle of the lower edge of said lower extent, and the other member having openings near respective upper corners, accessible where said one member is substantially semi-circular, and having a third opening near the middle of its bottom and accessible at said recess in said one member.

FREDERICK H. WELLER.